(12) United States Patent
Jacob et al.

(10) Patent No.: US 6,829,061 B1
(45) Date of Patent: Dec. 7, 2004

(54) METHOD FOR DETERMINING GRAY LEVELS IN A PRINTER

(75) Inventors: Steve A. Jacob, Boise, ID (US); George H. Kerby, Boise, ID (US); Terry M. Nelson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/502,412

(22) Filed: Feb. 10, 2000

(51) Int. Cl.⁷ ............................. G06F 15/00; G06K 1/00
(52) U.S. Cl. .................. 358/1.9; 358/519; 358/520; 358/523; 382/167
(58) Field of Search ................................. 348/254, 673, 348/674, 687; 358/519, 520, 523, 1.9; 382/167

(56) References Cited

U.S. PATENT DOCUMENTS

| | | | | |
|---|---|---|---|---|
| 4,410,908 A | * | 10/1983 | Belmares-Sarabia et al. | 348/661 |
| 4,679,067 A | * | 7/1987 | Belmares-Sarabia et al. | 348/655 |
| 4,812,905 A | * | 3/1989 | Rossi | 348/630 |
| 5,081,529 A | * | 1/1992 | Collette | 358/504 |
| 6,101,271 A | * | 8/2000 | Yamashita et al. | 382/167 |
| 6,101,272 A | * | 8/2000 | Noguchi | 382/167 |
| 6,111,607 A | * | 8/2000 | Kameyama | 348/256 |
| 6,396,505 B1 | * | 5/2002 | Lui et al. | 345/613 |
| 6,512,595 B1 | * | 1/2003 | Toda | 358/1.9 |
| 6,567,186 B1 | * | 5/2003 | Jacob et al. | 358/1.9 |

* cited by examiner

*Primary Examiner*—Kimberly Williams
*Assistant Examiner*—Michael Burleson

(57) ABSTRACT

The method of the invention converts colors resident in a first device color space to gray levels for reproduction by a single color marking media in a color or monochrome rendering device. The method converts a set of red, green and blue (RGB) primary color values received from a processor to gray level values. The method applies a gamma correction function to the RGB primary color values and further scales the values to a range of from 0 to 1. The method then converts the gamma-corrected and scaled RGB primary color values to a Y luminance value (in the XYZ tristimulus color space) through use of the expression:

$$Y = Y_R(R) + (Y_G - k_G)(G) + (Y_B + k_B)(B)$$

where: $Y_R$, $Y_G$, and $Y_B$ are coefficients that provide a luminance value in the XYZ color space in accordance with accepted observer standards; $k_G$ is a correction value that renders the green component darker; and $k_B$ is a correction value that renders lighter the blue component. The resulting luminance value is then converted to a device gray value and stored in a table for later use.

6 Claims, 2 Drawing Sheets

METHOD FOR DETERMINING GRAY LEVELS IN A PRINTER

FIELD OF THE INVENTION

This invention relates to a method for converting colors from a first device color space to gray levels for reproduction by a color or monochrome rendering device which employs a single color marking media to achieve the gray levels. More particularly, the invention relates to a method for attaining improved gray representations from a printer in response to a color image input from a monitor.

BACKGROUND OF THE INVENTION

It is well known that color monitors exhibit a larger color gamut than currently available laser and inkjet color printers. The prior art has suggested a number of methods for achieving more faithful reproduction of such monitor colors from computer printers. For instance, U.S. Pat. No. 5,081,529 to Collette describes a color calibration system that enables a user to achieve such more faithful color reproduction. Essentially, a hard copy print is made from a processed image and if it does not match the monitor image colors, a color correction algorithm is invoked which is responsive to operator adjustments to revise the color controls within the printer. Accordingly, after several iterations, a more faithful color reproduction from the printer is achieved.

To convert monitor red, green and blue (RGB) values to gray levels for reproduction by a color printer, the prior art has converted the monitor RGB color values to CIE L*a*b* color values (via an intermediate XYZ tristimulus color space conversion). Thereafter, the lightness (i.e., L*) values have been directly mapped to printer gray levels. Once such a gamut mapping was achieved, the resulting mapped values were converted to a table which was used to control the printer.

A more common prior art procedure for converting RGB colors to gray levels is described in SMPTE RECOMMENDED PRACTICE, RP 177-1993, section 3.3.8. In that document, the luminance value (i.e., the Y coordinate in XYZ tristimulus color space) is defined as:

$$Y=Y_R(R)+Y_G(G)+Y_B(B)$$

The derived Y luminance values are then scaled to device gray levels.

Gamut mapping from a monitor's color space to a color printer's gray levels has presented certain special problems. For instance, the above indicated color conversion procedure results in certain color components not reproducing well in the resulting gray image. For example, certain cyan components and yellow components of the image will disappear. This is especially the case when reproduction of light yellow and cyan monitor colors are attenuated by the printer—as the printer is particularly adapted to producing dark greens and not the lighter shades. Therefore, the lighter shades fail to be reproduced.

Accordingly, it is an object of this invention to provide an improved method for converting colors from a first device color space to gray levels which can be reproduced by a single color marking media in a color rendering device.

It is a further object of this invention to provide a method for converting colors from a first device color space to gray levels in a second device color space wherein improved gray representations for certain colors containing either green or blue are achieved.

SUMMARY OF THE INVENTION

The method of the invention converts colors resident in a first device color space to gray levels for reproduction by a single color marking media in a color or monochrome rendering device. The method converts a set of red, green and blue (RGB) primary color values received from a processor to gray level values. The method applies a gamma correction function to the RGB primary color values and further scales the values to a range of from 0 to 1. The method then converts the gamma-corrected and scaled RGB primary color values to a Y luminance value (in the XYZ tristimulus color space) through use of the expression:

$$Y=Y_R(R)+(Y_G-k_G)(G)+(Y_B+k_B)(B)$$

where: $Y_R$, $Y_G$, and $Y_B$ are coefficients that provide a luminance value in the XYZ color space in accordance with accepted observer standards; $k_G$ is a correction value that renders the green component darker; and $k_B$ also renders the blue component lighter. The resulting luminance value is then converted to a device gray value and stored in a table for later use.

DETAILED DESCRIPTION OF THE INVENTION

Figure 1:
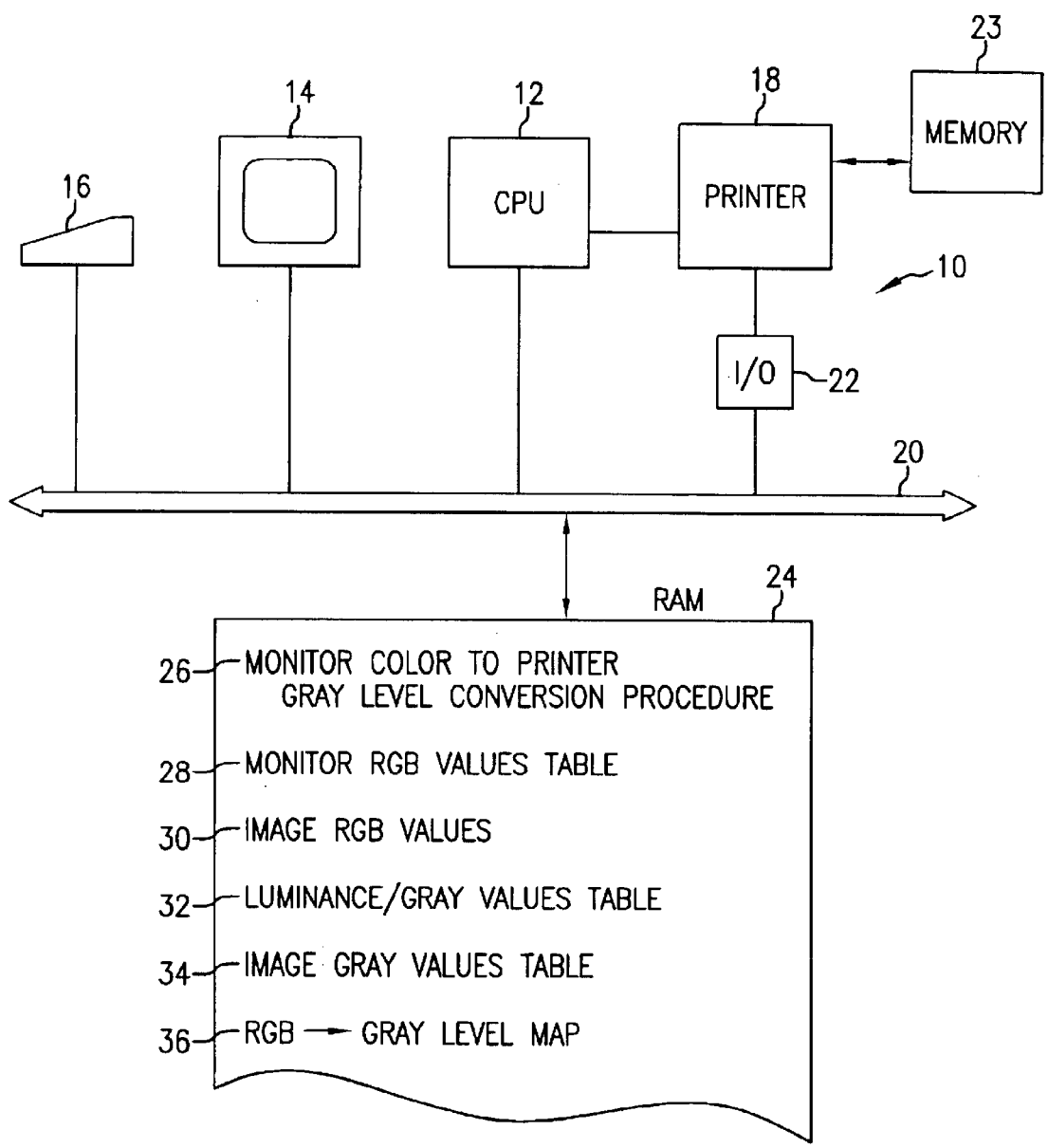
FIG. 1 illustrates a high level block diagram of a computer system that is adapted to carry out the invention hereof.

Referring to FIG. 1, a computer system 10 includes a central processing unit (CPU) 12 that provides overall control of computer system 10. A monitor 14 and keyboard 16 provide user interfaces to the remainder of the system. A printer 18, such as a color laser printer, is coupled to a bus system 20 via an input/output interface 22. Bus system 20 provides the main communication pathway between each of the separate elements of computing system 10.

A random access memory (RAM) 24 provides storage for the procedures and tables that are utilized during execution of the method of the invention. Hereafter, it will be assumed that the invention is executed in computer system 10, however it is to be understood that it may be implemented in an Application program, the operating system, or in a device driver. Alternately, a memory 23 that serves as part of printer 18 may be used to convert the RGB color values in cooperation with a processor in printer 18.

Among other procedures, RAM 24 includes a "monitor color-to-printer gray" conversion procedure 26 that enables conversion of monitor color values to gray levels, for reproduction by printer 18. As will hereafter be understood, it is preferred that printer 18 produce the gray values through the use of a single toner, such as black.

Also present within RAM 24 is a monitor RGB values table 28 that stores a set of RGB color values that are utilized to drive monitor 14 to manifest the respective colors. An area 30 of memory is used to store the RGB values of an image from monitor 14. RAM 24 further contains a luminance to printer gray value conversion table 32; an image gray value table 34 that stores the gray level values created as a result of execution of conversion procedure 26; and an RGB to gray level map 36 that is installed by the manufacturer. More particularly, table 36 stores the gray level values that are determined by conversion procedure 26 as providing a best representation of the monitor RGB values contained in table 28. RGB/gray level map 36 constitutes a table relating the monitor RGB values to printer gray level values and may be incorporated into a read-only memory for inclusion into printer 18. It is further to be understood that either the aforesaid look-up table or a real time algorithm can be used to accomplish the mapping function It is also to be understood, that the method of the invention is preferably used during a manufacturing operation so that RGB/gray level map 36 may be derived and incorporated into a ROM in printer 18.

Figure 2:
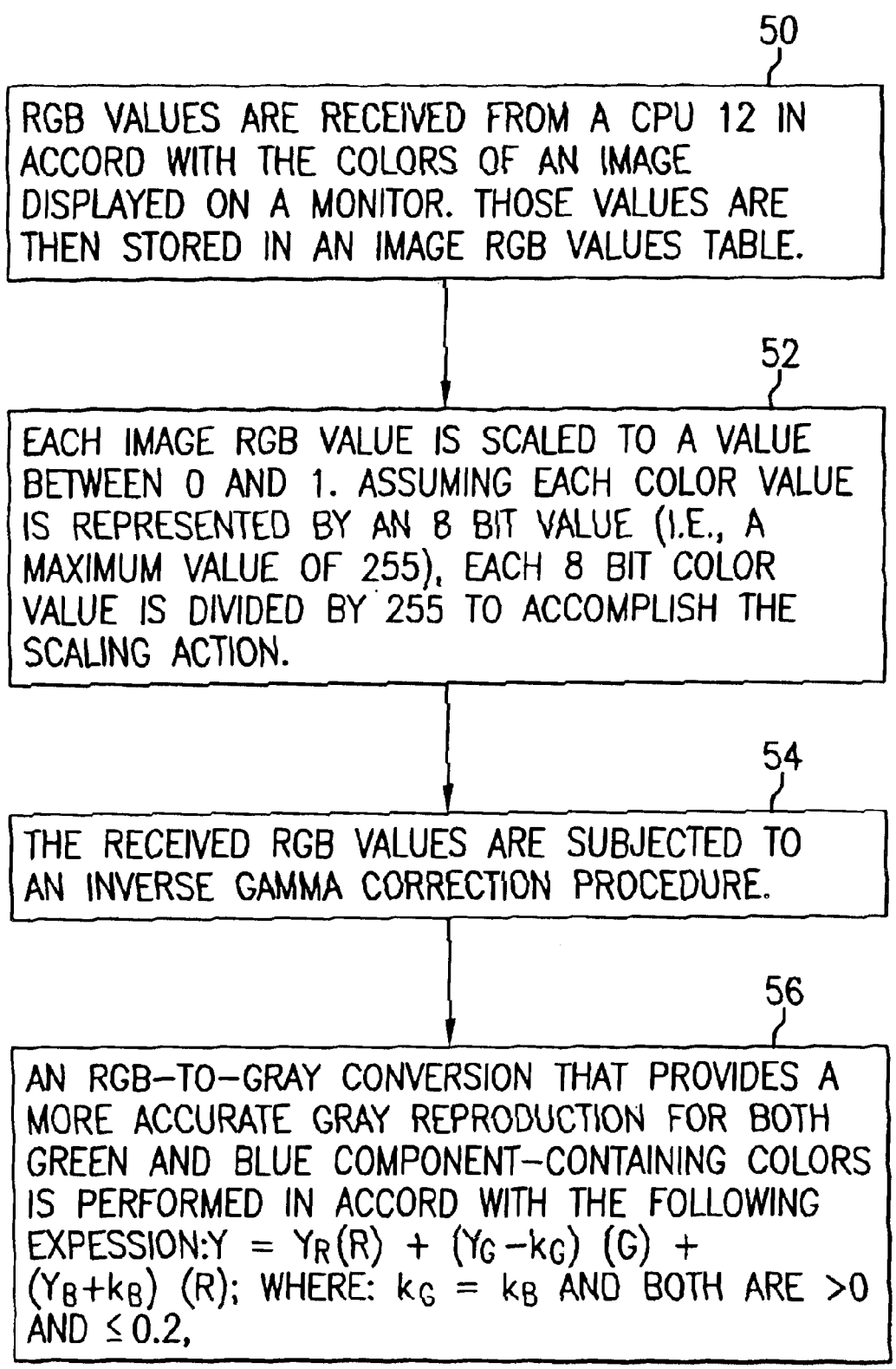
FIG. 2 is a flow diagram that illustrates the method of the invention.

The method of the invention is illustrated in FIG. 2. Initially, RGB values are received from CPU 12 in accord with the colors of an image displayed on monitor 14 (step 50). Those values are then stored in image RGB values table 30. Next, each image RGB value is scaled to a value between 0 and 1 (step 52). Assuming each color value is represented by an 8 bit value (i.e., a maximum value of 255), each 8 bit color value is divided by 255 to accomplish the scaling action.

To compensate for the response nonlinearities of monitor 14 to calculated RGB values, the received RGB values, as received, have been modified to include gamma corrections. In preparation for conversion to gray values, the gamma corrections are now removed from the RGB values by application of an inverse gamma correction procedure (step 54). This action results in a set of linear RGB tristimulus values that are ready for conversion to gray values.

Prior art color-to-gray conversions (e.g., the SMPTE RECOMMENDED PRACTICE mentioned above) have resulted in printers producing too light gray levels in areas dominated by dark green color values and too dark gray levels in areas dominated by light blue color values. The conversion from RGB color space to the XYZ tristimulus color space has been accomplished in accordance with the following standard: "International Electrotechnical Commission (IEC) Standard IEC 61966-2-1: Multimedia system and equipment—Color measurement and management—Part 2-1: Color management—Default color space-sRGB". Such conversion employed the following matrix relationships:

$$X=X_R(R)+X_G(G)+X_B(B)$$

$$Y=Y_R(R)+Y_G(G)+Y_B(B)$$

$$Z=Z_R(R)+Z_G(G)+Z_B(B)$$

where:

$$X_R=0.4124; X_G=0.3576; X_B=0.1805;$$

$$Y_R=0.2126; Y_G=0.7152; Y_B=0.0722;$$

and $$Z_R=0.0193; Z_G=0.1192; Z_B=0.9505.$$

The sum of the $Y_R(R)$, $Y_G(G)$ and $Y_B(B)$ terms (i.e., luminance terms) equals 255, assuming that the color values are 8 bits. As indicated above, those terms are as set out in the IEC standard.

To accomplish an RGB-to-gray conversion that provides a more accurate gray reproduction for both green and blue component-containing colors, it has been determined that the Y luminance coefficients in the above expression are to be modified as below $$Y=Y_R(R)+(Y_G-k_G)(G)+(Y_B+k_B)(R);$$

where:

$$k>0 \text{ and } \leq 0.2,$$

It is preferred that $k_G$ and $k_B$ have a preferred value of 0.04. Such a value provides gray levels that are lighter for reds, cyans and flesh tones; darker for greens and yellows and lighter for blues and magentas.

Accordingly, (step 56) the above expression is executed by monitor color to printer gray conversion procedure 26 for each RGB tristimulus value to achieve a luminance Y value with coefficient corrections for the green and blue components. The $k_G$ correction value, when subtracted from the $(Y_G)$ coefficient, darkens the green component value, while addition of the $k_B$ correction value to the $(Y_B)$ coefficient value lightens the blue component value.

It should be understood that the foregoing description is only illustrative of the invention. Various alternatives and modifications can be devised by those skilled in the art without departing from the invention. For example, while each of the procedures for implementing the invention are shown as already loaded into memory 24, they may be stored on a memory device 19 (see FIG. 1) for loading into system 10 on an as-needed basis. Accordingly, the present invention is intended to embrace all such alternatives, modifications and variances which fall within the scope of the appended claims.

What is claimed is:

1. A method for converting monitor color values to gray levels to be reproduced by a color or monochrome rendering device which employs a single color marking media to achieve gray levels, the method comprising the steps of:

a) applying a gamma correction function to said monitor color values;

b) converting the monitor color values corrected in step a) to a luminance value (Y) through use of following expression:

$$Y=Y_R(R)+(Y_G-k_G)(G)+(Y_B+k_B)$$

where: $Y_R$, $Y_G$, and $Y_B$ are coefficients that provide a luminance value for said corrected monitor color values;

$k_G$ and $k_B$ are correction values for lightening said G component and darkening said B component, respectively; and wherein $k_G=k_B$, and wherein $k_G$ and $k_B$ have values >0 and <0.2.

2. A method for converting monitor color values to gray levels to be reproduced by a color or monochrome rendering device which employs a single color marking media to achieve gray levels, the method comprising the steps of:

a) applying a gamma correction function to said monitor color values;

b) converting the monitor color values corrected in step a) to a luminance value (Y) through use of following expression:

$$Y=Y_R(R)+(Y_G-k_G)(G)+(G)+(Y_B+k_B)$$

where: $Y_R$, $Y_G$ and $Y_B$ are coefficients that provide a luminance value for said corrected monitor color values;

$k_G$ and $k_B$ are correction values for lightening said G component and darkening said B component, respectively; and wherein $k_G$ and $k_B=0.04$.

3. A method for converting monitor color values to gray levels to be reproduced by a color or monochrome rendering device which employs a single color marking media to achieve gray levels, the method comprising the steps of:

a) applying a gamma correction function to said monitor color values;

b) converting the monitor color values corrected in step) a) to a luminance value (Y) through use of following expression:

$$Y=Y_R(R)+(Y_G-k_G)(G)+(Y_B+k_B)$$

wherein: $Y_R$, $Y_G$ and $Y_B$ are coefficients that provide a luminance value for said corrected monitor color values;

$k_G$ and $k_B$ are correction values for lightening said G component and darkening said B component, respectively; and wherein said $Y_R$, $Y_G$ and $Y_B$ are coefficients that provides a luminance value for said corrected monitor color values in an XYZ tristimulus color space in accordance with IEC standard 61966-2-1.

4. A memory media including instructions for controlling a processor to convert monitor color values to gray levels to be reproduced by a color or monochrome rendering device which employs a single color marking media to achieve gray levels, the memory media comprising:
   a) means for controlling said processor to apply gamma correction function to said monitor color values;
   b) means for controlling said processor to convert the monitor color values corrected by means a) to luminance value (y) through use of the following expression:

$$Y=Y(R)+(Y_G 31\ k_G)(G)+(Y_B+k_B)$$

where: $Y_R$, $Y_G$ and $Y_B$ are coefficients that provide a luminance value for said corrected monitor color values;

$k_G$ and $k_B$ are corrected values for lightening said G component and darkening said B component, respectively; and wherein $k_G=k_B$, and wherein $k_G$ and $k_B$ have values >0 and <0.2.

5. A memory media including instructions for controlling a processor to convert to monitor color values to gray levels to be reproduced by a color or monochrome rendering device which employs a single color marking media to achieve gray levels, the memory media comprising:
   a) means for controlling said processor to apply gamma correction function to said monitor color values;
   b) means for controlling said processor to convert the monitor color values corrected by means a) to luminance value (Y) through use of the following expression:

$$Y=Y_R(R)+(Y_G-k_G)(G)+(Y_B+k_B)$$

where: $Y_R$, $Y_G$ and $Y_B$ are coefficients that provide a luminance value for said corrected monitor color values;

$k_G$ and $k_B$ are correction values for lightening said G component and darkening said B component, respectively; and wherein $k_G$ and $k_B$=0.04.

6. A memory media including instructions for controlling a processor to convert monitor color values to gray levels to be reproduced by a color or monochrome rendering device which employs a single color marking media to achieve gray levels, the memory media comprising:
   a) means for controlling said processor to apply gamma correction function to said monitor color values;
   b) means for controlling said processor to convert the monitor color values corrected by means a) to luminance value (Y) through use of the following expression:

$$Y=Y_R(R)+(Y_G-k_G)(G)+(Y_B+k_B)$$

where: $Y_R$, $Y_G$ and $Y_B$ are coefficients that provide a luminance value for said corrected monitor color values;

$k_G$ and $k_B$ are correction values for lightening said G component and darkening said B component, respectively; and wherein said $Y_R$, $Y_G$ and $Y_B$ are coefficients that provide a luminance value for said corrected monitor color values in a XYZ tristimulus color space in accordance with IEC standard 61966-2-1.

* * * * *